United States Patent Office 3,437,644
Patented Apr. 8, 1969

3,437,644
SOLUTION POLYMERIZATION
Eberhard W. Neuse, Santa Monica, and Kazuko Koda, Los Angeles, Calif., assignors, by mesne assignments, to McDonnell Douglas Corporation, Santa Monica, Calif., a corporation of Maryland
No Drawing. Filed Mar. 8, 1965, Ser. No. 438,121
Int. Cl. C08g *33/20, 33/00*
U.S. Cl. 260—80
8 Claims

ABSTRACT OF THE DISCLOSURE

Process for polycondensation by a Friedel-Crafts type reaction of aromatic compounds, particularly benzyl derivatives and metallocenes (dicyclopentadienylmetal compounds), in the presence of certain dipolar aprotic solvents. For example, polybenzyl was prepared by reacting benzyl ether in the presence of anhydrous zinc chloride catalyst and dry sulfolane solvent, at a temperature of 105° C. until short strings could be withdrawn from a sample at room temperature.

---

This invention relates to a new process for the preparation of polymeric compounds. More particularly, the invention relates to a process for the preparation of polymeric compounds via Friedel-Crafts type reactions. More specifically, it deals with a process for the preparation of polymerization or polycondensation products via Friedel-Crafts type aromatic alkylation and acylation reactions, said reactions taking place in a liquid medium comprising certain organic solvents.

Friedel-Crafts type reactions have long been known in preparative organic chemistry, and their description may be found in all standard chemistry text books. Friedel-Crafts alkylation or acylation of aromatics is a reaction whereby hydrogen on an aromatic nucleus is replaced by an alkyl group or an acyl group through the action of an alkylating agent or an acylating agent in the presence of a Friedel-Crafts catalyst. While the alkylating agent is usually an alkyl halide, an alcohol or an alkene, the acylating agent may be an acid chloride or an acid anhydride. In place of the alkylating agents mentioned above, other reactants can be used that furnish an alkylating agent in the course of the reaction. Compounds of this type comprise esters, such as dimethyl sulfate, alkyl or aralkyl ethers, and aldehydes and ketones.

Although the usual types of Friedel-Crafts reactions involve monomeric end-products, use of the Friedel-Crafts alkylation or acylation procedure in polycondensation reactions, i.e., in such reactions that lead to polymeric end-products, has also been made. Such Friedel-Crafts type polycondensations are usually conducted in bulk, i.e., in the melt phase in the absence of solvents. Also, concentrated sulfuric acid is occasionally used in said polymcondensation reactions, thus combining catalytic and solvent effects.

Thus, for example, novolac-type polymers containing the metallocenyl radicals of the highly aromatic dicyclopentadienylmetal compounds, namely, ferrocene (dicyclopentadienyliron), ruthenocene (dicyclopentadienylruthenium) and osmocene (dicyclopentadienylosmium), have been synthesized by Friedel-Crafts type polycondensations of ferrocene, ruthenocene or osmocene with aldehydes or ketones, in the presence of Friedel-Crafts catalysts. These reactions have generally been carried out in bulk, that is, with the reactants and suitable catalysts alone and in the absence of solvents, and in some instances under pressure employing pressure vessels.

It is an object of this invention to provide an improved method for the preparation of polymerization or polycondensation products, said process utilizing Friedel-Crafts type alkylation or acylation reactions.

It is another object of this invention to provide an improved method for the preparation of polymerization or polycondensation products, said process utilizing Friedel-Crafts type alkylation or acylation reactions, and employing an organic solvent medium for the reaction.

Yet another object is the provision of improved procedure for the preparation of polymerization products by a Friedel-Crafts type reaction which can be carried out at substantially normal pressure.

A still further object is to provide an improved process for the preparation of benzyl polymers and polymers of ferrocene, ruthenocene and osmocene, particularly ferrocene polymers, by condensation of benzyl monomers or of suitable metallocene monomers in Friedel-Crafts type reactions employing suitable acid catalysts, in the presence of suitable alkylating or acylating radicals or compounds, such reaction being carried out in certain organic solvents, and preferably avoiding the need for pressurizing the reaction.

Other objects and advantages of the invention will appear hereinafter.

We have now found that Friedel-Crafts type polymerization or polycondensation reactions can be conducted advantageously in solution employing certain dipolar aprotic solvents, particularly dipolar aprotic solvents possessing low base strength, coupled with poor cation solvating power. The term "dipolar aprotic solvent" as employed herein is understood as conventionally used in physical-chemical terminology. Hence, the definition by Parker in Quarterly Reviews, 16, 163 (1962) can be followed, which defines dipolar aprotic solvents as such solvents that exhibit a dielectric constant greater than 15 and, although they may contain hydrogen atoms, cannot donate suitably labile hydrogen atoms to form strong hydrogen bonds.

For the purpose of the present invention, solvents of low basicity are those whose $pK_a$ (negative logarithm of the acidity constant, $K_a$) values, determined in aqueous acid solvent media, fall in the range from approximately $-9.0$ to $-12.5$, preferably $-10.0$ to $-12.0$. Solvents of poor cation solvating power are commonly understood as being such solvents in which cations are poorly solvated, because, for instance, the negative portions of the solvent dipole is dispersed or is on an unfavorable electron-donor atom or is surrounded by bulky groups, as described by Parker, supra. In contrast, such dipolar aprotic solvents that have a negative charge localized on a bare oxygen atom have been reported by H. E. Zaugg, J. Am. Chem. Soc., 82, 2903 (1960) to solvate cations strongly.

Those dipolar aprotic solvents which fulfill the requirement of low basicity and poor cation solvating power in accordance with the invention and which are therefore suitable for the purpose of the invention, include sulfones, sulfolanes, aliphatic nitriles, aromatic nitriles, nitroaliphatics and nitroaromatics.

In accordance with the invention, the reactants suitable for Friedel-Crafts type polycondensation in the solvent media noted above, can be a single compound comprising an aromatic group to which there is attached a group that functions as the alkylating or acylating agent. Thus, the reactant can be a compound as exemplified by the reactant in Equation 1 below, in which R' and R" stand for hydrogen, alkyl, e.g., methyl, ethyl and the like, aryl such as phenyl, naphthyl, and the like, or aralkyl, e.g., phenylmethyl, naphthylethyl and the like, or variously substituted alkyl, aryl or aralkyl groups, X represents halogen, e.g., chlorine, bromine and fluorine, or the hydroxyl radical, and Ar is an arylene residue, i.e., an aromatic unit from which are removed two hydrogen atoms:

(1)
$$nH\text{—}Ar\text{—}C(R')(R'')X \rightarrow \text{\textlbrackdbl}Ar\text{—}C(R')(R'')\text{\textrbrackdbl}_n + nHX$$

where $n$ is a positive integer greater than 1, e.g., from 2 to about 50, or more.

Such reactant can thus be an arylcarbinyl compound such as a benzyl derivative, e.g., benzyl alcohol, benzyl chloride, benzyl ether or variously substituted benzyl alcohols, halides or ethers, e.g., o-hydroxybenzyl alcohol, o-methylbenzyl alcohol, benzyl chloride, dibenzyl ether, and the like. It can also be a diphenyl- or triphenyl-carbinol, or the corresponding halide or ether, e.g., triphenylmethyl chloride, benzhydryl chloride, dibenzhydryl ether, and the like. In place of a phenyl group, other aromatic nuclei can be involved as portions of the reactant, e.g., the radicals of fused ring systems such as naphthalene and anthracene; preferred are the radicals of such aromatic systems that exhibit a high degree of aromaticity and hence are classed as aromatics for purposes of the invention, including, for example, the radicals of the metallocenes, namely, ferrocene, ruthenocene and osmocene, commonly referred to as metallocenyl, that is, ferrocenyl, ruthenocenyl and osmocenyl. Examples of such compounds are metallocenyl alkanols, particularly metallocenylcarbinyl compounds such as ferrocenyl carbinol and ferrocenyl ethanol.

Instead of using only a single reactant of the aforementioned type, two or more different reactants can be employed, one or more of which comprise the aromatic unit, whereas one or more of these reactants function as the alkylating or acylating agents or are capable of producing said agents during the reaction. Thus, while one reactant may be a compound of high aromaticity such as ferrocene, the second reactant can be a compound possessing or capable of producing, two alkylating or acylating functions of the aforementioned types, as exemplified by Equations 2 and 3 below, in which Ar stands for arylene, X can be hydroxyl, alkoxy such as methoxy, ethoxy, and the like, or halide such as chloride or bromide, and R represents any divalent bridging unit, preferably aralkylene or alkylene, e.g., the benzal or methylene radical, and also a unit comprising hetero atoms such as Si, P, and As. Compounds exemplifying the component XRX in Equation 2 are phenyldichloroarsine, phenyldichloroarsine oxide, chloral hydrate, dimethoxymethane, and the like.

(2)  $(n+1)HArH + nXRX \rightarrow H\text{\textlbrackdbl}Ar\text{—}R\text{\textrbrackdbl}_nArH + nHX$ (3)  $(n+1)HArH + nXCO\text{—}R\text{—}COX \rightarrow$
$H\text{\textlbrackdbl}Ar\text{—}CO\text{—}R\text{—}CO\text{\textrbrackdbl}_nArH + nHX$ In the latter reaction, the second reactant is a diacid chloride, e.g., phthaloylchloride.

It is also possible to employ reactants of the types specified in Equation 4 below, i.e., an aromatic compound in conjunction with a carbonyl compound, the latter having the function of producing the alkylating agent as an intermediate.

(4)  $(n+1)H\text{—}Ar\text{—}H + nCO(R')(R'') \rightarrow$
$H\text{\textlbrackdbl}Ar\text{—}C(R')(R'')\text{\textrbrackdbl}_nArH + nH_2O$ In the above Equation 4, Ar, R' and R" have the values noted above. Thus, H—Ar—H in Equation 4 can be ferrocene, ruthenocene or osmocene, and the carbonyl reactant can be an aldehyde or a ketone or a compound capable of releasing an aldehyde or a ketone under the conditions of the reaction. Examples of such derivatives are trioxane, which is a cyclic trimer of formaldehyde, or dimethoxymethane, which is the dimethyl acetal of formaldehyde. Examples of suitable aldehydes and ketones include acetaldehyde, benzaldehyde, naphthaldehyde, acetone, acetophenone, benzophenone, and the like. Substituted carbonyl reactants, e.g., aldehydic or ketonic reactants, containing unsaturated or functional side groups also can be employed. Examples of such aldehyde and ketone reactants include carboxybenzaldehyde, cyanobenzaldehyde, hydroxybenzaldehyde, methoxybenzaldehyde, dimethylaminobenzaldehyde, crotonaldehyde, chloral, furfural, p-methoxyacetophenone, p-hydroxyacetophenone, p-carboxy benzophenone, hexafluoroacetone, and the like.

It is understood that in the process of the present invention as described in the specification and as defined in the claims, the terms "alkylating agent" and "acylating agent" are intended to denote agents of the types described above, which function either directly as alkylating or acylating agents, or which function to produce alkylating or acylating agents during the course of the reaction.

As previously noted, the above described polymerization reactions carried out in solvent media according to the invention, take place in the presence of a Friedel-Crafts catalyst. The Friedel-Crafts catalyst is an acidic catalyst, preferably a Lewis acid, i.e., a strongly electrophilic compound selected from the class of metal halides consisting of $AlCl_3$, $FeCl_3$, $SnCl_4$, $BF_3$, $SbCl_6$, $ZnCl_2$, $TiCl_4$. Of these, $AlCl_3$ and $ZnCl_2$ are the most frequently used catalysts. In some cases proton acids such as HCl and $H_3PO_4$, can serve as catalysts.

Examples of dipolar aprotic solvents, preferably of low basicity and poor cation solvating power which can be employed according to the invention principles in the above described Friedel-Crafts type polymerization reactions, include dialkyl and diaryl sulfones, e.g., diethyl sulfone, diphenyl sulfone, ditolyl sulfone, sulfolane (tetramethylene sulfone), and its alkyl substituted, e.g., methyl derivatives, such as 3-methyl- and 2,4-dimethylsulfolane, alkyl cyanides such as acetonitrile, propionitrile, and butyronitrile, aryl cyanides such as benzonitrile and tolunitrile, nitroalkanes such as nitromethane and nitroethane, and nitroaromatics such as nitrobenzene, and nitrotoluene.

The novel process of this invention is carried out preferably by heating with stirring under a nitrogen blanket, one of the reactants or reactant combinations described above in the presence of catalyst and solvent at a temperature that can range from room temperature to the reflux temperature of the solvent selected, preferably from about 70° to about 160° C., until the desired conversion to polymeric product has occurred. The point of termination of the reaction can be determined by testing on small drawn samples the stringiness, i.e., the capability of the concentrated solution to be drawn to fine polymer strings.

The amount of solvent used can vary within wide ranges. For example, it may be as small as about 10% by weight of the starting material or materials employed and may be as large as ten times or more of the weight of the starting material. It is generally advisable to keep the amount of solvent at a minimum, i.e., to employ the minimum volume of solvent required to attain a homogeneous solution. It is not always necessary to bring the starting materials or reactants completely into solution during the initial reaction phase. In some cases it suffices to allow a major portion of the reactant or reactants to dissolve; as these components are consumed during the reaction, the portion theretofore undissolved will then gradually dissolve and undergo reaction. As the reaction proceeds, the stiffening solution can be gradually diluted by adding more solvent in incremental portions.

In those cases where the attainment of high molecular weights is the primary goal, the process may be modified by first condensing a portion of the monomeric reactant or reactants in a small volume of solvent until reasonably high conversion to low-molecular-weight polymer has occurred as indicated by increased viscosity of the solution. Subsequently, additional reactant or reactants, either as such or mixed with additional solvent, are added to the reaction mixture in very small increments so as always to keep the monomer concentrations low.

While any solvent selected from the class of solvents noted above may be employed, it is preferable to choose for each case the particular solvent most appropriate. In general, those members of the class of solvents specified above are preferred that are water-miscible, are good solvents for the polymeric product formed in the reaction and have boiling points well above the desired reaction temperature. Thus, sulfolane and some of its methyl derivatives such as the 3-methyl and 2,4-dimethyl derivatives, are particularly well suited for the process of this invention.

Although the catalyst can be any of thte Lewis acid compounds listed above, preference is given to zinc chloride. In special instances, e.g., where the aromatic reactant is sufficiently activated for electrophilic substitution, a proton acid such as hydrochloric acid can be employed as the catalyst. Catalyst concentrations may vary widely, depending on catalyst, type, on reaction rate and, coupled therewith, reaction temperature. Generally, catalyst concentrations are lower than in monomeric Friedel-Crafts type reactions, in which commonly equimolar amounts of alkylating or acylating agent and Lewis acid are employed. Thus, catalyst concentrations can be in the range from about 3 to about 25% by weight of starting material, but other concentrations may also be appropriate depending on other reaction conditions.

Work-up of the reaction products can be accomplished by conventional techniques. Generally, the catalyst is first removed from the more or less highly viscous solution by extraction with water. The polymeric product is then isolated and purified by selective extraction and/or reprecipitation. Monomeric contaminants, if any, are subsequently removed from the polymer by extraction, sublimation or chromatography. The polymers are then preferably thoroughly dried in a high vacuum to remove all traces of included solvents.

Utilization in Friedel-Crafts type polycondensations as described above, of the solvents noted above in accordance with the invention provides several advantages over polymerization or polycondensation conventionally carried out in bulk. These advantages include: (1) higher conversions are attainable because the last remaining portions of the reactants are less easily trapped and are more fully consumed; (2) the reactions can more easily be controlled with respect to reactant ratios; that is, homogeneous employment of the reactants in desired ratios is facilitated; (3) lower temperatures can be employed, thus generally resulting in less side-reactions, higher purity, higher molecular weights and sometimes less discoloration of the end-products; (4) modifications of the reaction, such as incremental addition of reactants with the purpose of further increasing the average molecular weight of the end-products, can be more easily accomplished; (5) synthesis of many polymer structures is possible that cannot be prepared by bulk techniques owing to high melting points of the starting materials and/or reaction products and the correspondingly high melt temperatures required to achieve homogeneity; (6) it is frequently possible to conduct under normal atmospheric pressure and in conventional polycondensation equipment reactions that otherwise generally call for closed systems (pressure reactions) owing to high volatility of one of the reactants.

The following examples, in which all parts are by weight, illustrate practice of the present invention. Unless otherwise stated, the starting materials in these examples are commercially available materials.

EXAMPLE 1

Preparation of a polybenzyl polymer essentially having the units:

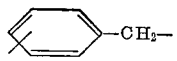

Benzyl ether, 9.9 parts, was mixed with 5.2 parts of anhydrous zinc chloride and 5.0 parts of dry sulfolane (tetramethylene sulfone, M.P. 27° C.). The mixture was charged into a reaction vessel equipped with a mechanical stirrer. The mass was heated at 105° C. with stirring under a blanket of dry nitrogen until the viscosity of the solution had reached a state such as to enable short strings to be drawn from a sample cooled to room temperature. Depending on the total batch size, this stage was usually attained after approximately 18 hours of heating. The sticky, resinous reaction product was thoroughly washed with water for catalyst removal and was reprecipitated from dioxane solution into excess isopropanol, 45 parts of solvent and 120 parts of precipitant being used in this process. The resinous precipitate was washed with isopropanol and was dried for 7 days at 50° C. in vacuo. There was obtained 4.4 parts (48.8% of theoretical yield) of a semisolid, sticky, off-white resin showing a number-average molecular weight, $M_n$, of 860 (in benzene solution) and the following analytical data: C, 90.07; H, 6.82. For the the polymer unit $C_7H_6$ above, the calculated percentages are: C, 93.29; H, 6.71 (the slightly low C content found indicates the presence, in a small degree, of ether groups in the product). The polymer dissolved readily in such solvents as benzene, toluene, dioxane, pyridine, chloroform and cyclohexanone, was insoluble in water and practically so in aliphatic alcohols and hydrocarbons.

From the concentrated mother-liquor there was obtained a second, considerably smaller portion of product, which after washing with isopropanol and drying as before, contained oligomeric compounds; it weighed 1.1 parts (12.2% yield) and game $M_n$ 590.

EXAMPLE 1a

Similar results as in Example 1 were obtained in other runs in which the catalyst concentration was raised further and the reaction time correspondingly shortened. Also, raising the temperature resulted in correspondingly shorter reaction periods required to reach the resinous stage described above. Thus, where the catalyst concentration was doubled and the reaction period reduced by approximately one-half, the resulting polymer exhibited an $M_n$ value of 890. When the temperature was raised to 120° C., the heating period required to obtain polymer in the $M_n$ range 800–900 was, depending on the batch size, approximately 11 hours.

EXAMPLE 2

Preparation of polybenzyl

The mixture of 10.0 parts of reagent grade benzyl alcohol (B.P. 203–205° C.), 2.0 parts of anhydrous zinc chloride and 5.0 parts of dry sulfolane was treated as described in Example 1, employing a temperature of 150° C. and a heating time of 30 hours. At the end of this heating period, the solution had become highly viscous, and strings could be drawn from a hot sample. Work-up as in Example 1 gave 4.6 parts (50.6% yield) of polymer. The product, an almost white, powdery solid, showed the melting range 50–60° C. and the same solubility properties as the polymer in Example 1. The $M_n$ value (in benzene) was 860, and elemental analysis gave the following: C, 89.06; H, 6.63; thus again indicating a small content of ether oxygen.

EXAMPLE 2a

In other runs similar to those in Example 2, the reactions were conducted to still more advanced stages, thus resulting in increased molecular weights. These advanced stages were attained by extending the heating time, increasing the catalyst concentration or raising the temperature. For example, if in the above-described reaction of Example 2, the overall heating periods were extended to 45, 60, and 80 hours, the polymers isolated from these runs exhibited $M_n$ values of 980, 1050, and 1340, respectively. The last-named reaction product gave the following analytical results: C, 92.16; H, 6.66, thus indicating closer agreement in composition with that of the polymer unit $C_7H_6$. Similar effects resulted from a progressive increase in catalyst concentration with unchanged reaction time.

EXAMPLE 2b

Still other runs were conducted in the above-described manner of Example 2, except that benzyl chloride was substituted for benzyl alcohol and/or that other aprotic solvents of the specified type were used in lieu of sulfolane. In all instances, the same end-products were obtained under comparable reaction conditions. Thus, 10.0 parts of benzyl alcohol, 4.0 parts of anhydrous zinc chloride and 10.0 parts of diphenylsulfone were heated for 60 hours at 140° C., work-up as in Example 2 (sulfone solvent removed by extraction of the melt with hot isopropanol) gave 4.8 parts (57.7% yield) of polybenzyl melting at 65–75° C. This product, a completely colorless solid, had $M_n$ 1340 (in benzene) and gave the following analytical data: C, 92.65; H, 6.51.

EXAMPLE 3

Preparation of polybenzyl

A run was conducted under the conditions of Example 2 above, using the components and amounts therein employed. After a total heating time of 45 hours, 3.0 parts of sulfolane were added along with additional 0.5 part of benzyl alcohol. Heating was continued at the specified temperature (150° C.), while additional benzyl alcohol was added in three portions of 0.5 part each in intervals of five hours. After a total of 80 hours heating time, the viscous resin was worked up as in Example 1 to give 6.9 parts (69.2% yield) of a yellowish, powdery solid, which melted at 60–70° C., had a molecular weight of 1420 (benzene) and showed the following analytical data: C, 91.62; H, 6.59. An additional 0.9 part (9.0% yield) of lower-molecular polybenzyl was collected from the mother liquor.

It is apparent from the above examples that the temperature, heating time, catalyst concentration and amount of solvent all can be controlled with ease, thus allowing for the preparation of polymers with $M_n$ values in specified ranges. Thus, the solution polycondensation technique of the invention offers a great advantage over heretofore known methods of preparation of polybenzyl (a typical experimental procedure, whereby benzyl alcohol is polycondensed with concentrated sulfuric acid, is given by R. L. Shriner and A. Berger, J. Org. Chem., 6, 305 (1941)), in which little or no control of the polymer molecular weight was possible. In addition, the products obtained by the novel solution condensation technique are usually of a lighter color than are polybenzyls prepared by known techniques.

EXAMPLE 4

Preparation of a novolac-type phenolic polymer having the units:

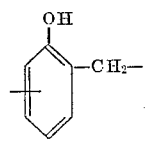

The mixture of 12.4 parts of previously recrystallized o-hydroxybenzyl alcohol (M.P. 81–83° C.), 0.12 part of anhydrous zinc chloride and 6.2 parts of dry sulfolane was heated at 100° C. with stirring following the procedure of Examplee 1. After 3.5 hours, when the solution began to show "stringiness," i.e., allowing for short strings to be drawn from a hot sample, another portion of 6.2 parts of sulfolane was added and heating continued. After a total of 9 hours heating time, and again after a total of 11 hours heating time, additional portions, each 6.2 parts, of the solvent were added. Upon the last addition, heating was continued for another hour. At this point, the solution had turned into a sticky, honey-like resin, which was thoroughly washed with warm water for removal of catalyst and unreacted starting material. The dried resin was then dissolved in 250 parts of a 70:30 (by volumee) mixture of dioxane and N,N-dimethylformamide. The filtered solution was slowly, with rapid stirring, poured into 1500 parts of water, whereby the polycondensation product precipitated as a resin. Some lower-molecular product still present in the supernatant liquid in emulsified form was precipitated by shaking the liquid briefly with 0.1 part of sodium chloride. The combined resinous portions were washed with water and were dried at 40° C. for 10 days in vacuo. The powdered polymer, 8.9 parts (82.4% yield), was light-brown in color, showed solubility in pyridine and dioxane-dimethylformamide mixtures, but was insoluble in water and alcohols. The $M_n$ value (in pyridine) was found to be 1310. Elemental analysis gave the following percentages: C, 74.13; H, 6.30. The unit $C_7H_6O$, above, requires: C, 79.22; H, 5.70. A polymer prepared for comparison from o-hydroxybenzyl alcohol (6.2 parts) and anhydrous zinc chloride (0.06 part) by the known procedure of melt condensation (e.g., by heating for 70 minutes at 90° C. and working up as before) showed $M_n$ 1200 (in pyridine) and gave the analytical data below: C, 69.85; H, 6.63. These analytical findings indicate a greater deviation from the calculated composition than observed above for the product of solution polycondensation.

EXAMPLE 5

Preparation of a ferrocene polymer essentially having the units:

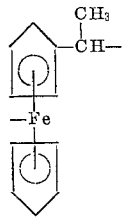

Using the equipment described in Example 1, the mixture of 3.0 parts of α-ferrocenylethanol, 4.0 parts of sulfolane and 0.2 part of 33% aqueous hydrochloric acid was heated for 3 hours at 65° C. with stirring under a blanket of nitrogen. The starting material, α-ferrocenylethanol (1-hydroxyethylferrocene) was prepared by the method of E. W. Neuse and D. S. Trifan, J. Am. Chem. Soc., 85, 1952 (1963). Upon the addition of one part of the solvent, heating was continued for another 3 hours. The melt was thoroughly washed for catalyst removal, was dried for 24 hours over $P_2O_5$ and was dissolved in 25 parts of benzene. From the filtered solution, the polymeric product was precipitated by 120 parts of a 90:10 (by volume) isopropanol-water mixture. Evaporation of the mother liquor to dryness resulted in isolation of a second, smaller portion of oligomeric product, bringing the total yield of condensatioon product to 2.2 parts (80.0% yield). The first, major fraction, after vacuum-drying for 10 days at 50° C., showed the melting range 95–105° C. and an $M_n$ value of 930 (in benzene) and gave the following analytical data: C, 67.97; H, 5.50; Fe, 26.43. Required for the polymer unit $C_{12}H_{12}Fe$, above: C, 67.96; H, 5.70; Fe, 26.34.

The procedure described above allows for the preparation of polymer in the low, narrow molecular weight range (narrow melting range) under easily controlled conditions. In contrast, by the known procedure of melt polycondensation, control of the molecular weight in this low range is difficult owing to incomplete and nonhomogeneous mixture of the aqueous catalyst with the non-aqueous melt phase, as evidenceed by the wide melting range (50–90° C.), i.e., wide molecular weight distribution reported for the melt condensation product of equal elemental composition.

EXAMPLE 5a

In other runs similar to that of Example 5, anhydrous zinc chloride or aluminum chloride was used as catalyst in concentrations ranging from 1 to about 20% by weight of starting material. The temperatures were in the 80–150° C. range. In all instances, the polymers obtained had the composition above in Example 5 and exhibited $M_n$ values within controllable ranges depending on catalyst type and concentration, temperatures and reaction times employed. Thus, a run conducted as in Example 5 above, except that the hydrochloric acid catalyst was substituted by a like amount of anhydrous zinc chloride and the temperature was 140° C., furnished polymer with $M_n$ 1830.

EXAMPLE 6

Preparation of a polymer having the units:

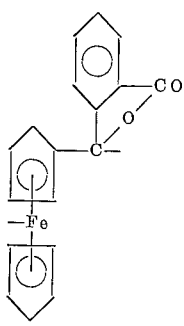

Following the procedure of Example 1, the mixture of one part of o-terrocenoylbenzoic acid, 0.15 part of anhydrous zinc chloride and one part of sulfolane were heated for 3 hours to 115° C. The reaction product, freed from catalyst by water extraction, was taken up in 13 parts of peroxide-free dioxane. From the filtered solution, the polymer was precipitated by excess water. The dried precipitate was extracted with ethyl ether to remove unreacted starting material and was dried in vacuo to give 0.4 part (42.1% yield) of brown, powdery polymer infusible up to 300° C.

The molecular weight $M_n$ was 1530 (in pyridine), and the analytical data were as follows: C, 66.44; H, 4.32. The theoretical for the polymer unit $C_{18}H_{12}FeO_2$, above, requires: C, 68.39; H, 3.83. The slight deviation in the carbon and hydrogen contents indicates the presence, to a small extent, of free carboxyl groups, either as side-groups or as end-groups in the polymer molecule, as was also indicated by infrared absorption. The polymer dissolved readily in pyridine, largely in dioxane and was insoluble in water and practically so in low molecular aliphatic ethers and alcohols.

The synthesis of the polymer prepared in this example by melt polycondensation would require temperatures above 200° C. owing to the high melting point (188–190° C.) of the starting material. The o-ferrocenoylbenzoic acid employed as reactant in the described procedure can readily be made from ferrocene and phthalic anhydride by known Friedel-Crafts procedures, e.g., by reacting 93.0 parts of ferrocene, 74.0 parts of phthalic anhydride and 133.5 parts of anhydrous aluminum chloride in 1000 parts of dry methylene chloride with stirring under dry nitrogen.

EXAMPLE 7

Preparation of a polymer essentially having the structure:

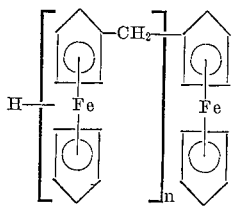

The mixture of 18.6 parts of ferrocene, 9.0 parts of s-trioxane (trimeric formaldehyde), 2.32 parts of anhydrous zinc chloride and 10.0 parts of dry sulfolane was heated at 120° C. following the procedure of Example 1. After the first three hours of heating a mixture of 4.5 parts of s-trioxane, 9.3 parts of ferrocene and 10.0 parts of sulfolane was gradually added to the resinous solution in small portions over a period of eight hours. After a total of 22 hours heating time, the resinous reaction product was washed with water for catalyst removal and, after drying, was dissolved in 130 parts of benzene. From the filtered solution, the major polymer portion was precipitated by 300 parts of isopropanol. This fraction, after washing and vacuum-drying in the usual manner, weighed 17.9 parts (60.5% yield) and melted at 135–150° C. The yellow-brown powdery solid had $M_n$ 3470 (in benzene) and gave the following analytical data: C, 66.78; H, 5.23; Fe, 27.77. Required for the composition above, with $n=17$: C, 66.60; H, 5.11; Fe, 28.30. From the mother liquor, combined with the isopropanol washings and partially evaporated, excess water precipitated a small second fraction of product. After removal of admixed starting material by vacuum sublimation, this polymer portion, 0.6 part, had an $M_n$ value of 700.

Both polymer fractions were identical in elemental composition and infrared absorption spectro with polymer prepared by the known procedure, which involves a pressure reaction, i.e. condensation in an autoclave or in sealed glass tubes and which gives lower yields in high-molecular-weight polymer, in addition to requiring the more expensive dimethoxymethane in lieu of trioxane for satisfactory conversion.

EXAMPLE 8

The procedure of Example 7 was followed except that benzonitrile was employed in lieu of sulfolane as the solvent, the temperature was lowered to 90° C. and the heating time reduced to 2.5 hours. The resulting major polymer fraction, having essentially the polymeric structure shown in Example 7 above, obtained in somewhat lower yield than in the preceding example, had an $M_n$ value of 1850 and gave the following analytical data: C, 67.01; H, 5.20; Fe, 27.53.

EXAMPLE 9

Preparation of a polymer essentially having the structure:

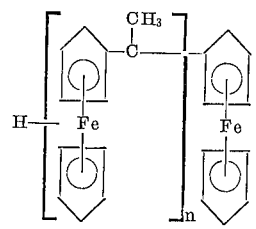

In this run the equipment described in Example 1 was used except that a reflux condenser cooled by a Dry Ice-acetone mixture was attached to the vessel. The vessel was charged with a mixture of 9.3 parts of ferrocene, 4.4 parts of acetaldehyde, 2.3 parts of anhydrous zinc chloride and 50 parts of sulfolane. The mixture was heated for a total of 75 hours at 90° C. with stirring under a blanket of dry nitrogen. During this heating period, additional 28.0 parts of acetaldehyde were added every 5 hours in small portions, each approximately 2 parts. Work-up as in Example 7 gave two polymer fractions (total yield 5.9 parts, corresponding to 57.2%). The first fraction constituting the higher-molecular-weight material had $M_n$ 2580 (in benzene) and gave the analytical data below: C, 67.36; H, 6.31. Required for the composition above, with $n=11$: C, 67.70; H, 5.68. Both polymer fractions are infrared spectroscopically identical with the products obtained by the known method which involves condensation under pressure, i.e., in an autoclave or sealed tube, and usually gives polymers of lower molecular weight.

EXAMPLE 10

Preparation of a polymer exhibiting the structure:

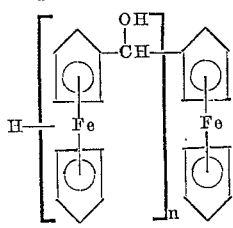

The mixture of 3.0 parts of glycolaldehyde, 9.3 parts of ferrocene, 1.9 parts of anhydrous zinc chloride and 6.2 parts of sulfolane was heated for 8 hours at 125° C. following the procedure of Example 1. The reaction product was washed with water, dried and dissolved in 180 parts of peroxide-free dioxane. The filtered solution was poured into 600 parts of agitated water, and the precipitate, after drying, was subjected to a Soxhlet extraction using hexane as extractant. The hexane-insoluble, brown solid remaining from the extraction was vacuum-dried. There was thus obtained 1.0 part of polymer, which was soluble in dioxane, dimethylformamide and pyridine and gave an $M_n$ value of 1200 (in pyridine) and the following elemental analytical data: C, 64.15; H, 5.39. The theoretical polymer composition above, with $n=5$, requires: C, 63.43; H, 5.32. From the hexane extract, by evaporation to dryness and removal of ferrocene through vacuum sublimation, a second fraction, 0.8 part, of product was obtained, which gave the analytical data below: C, 63.59; H, 5.51. The portion of ferrocene recovered by sublimation amounted to 5.0 parts.

EXAMPLE 11

Preparation of a polymer essentially having the structure:

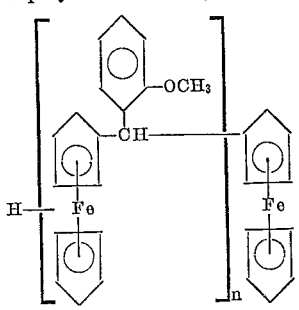

The mixture of 12.24 parts of freshly distilled o-anisaldehyde (o-methoxybenzaldehyde), 18.41 parts of ferrocene, 1.84 parts of anhydrous zinc chloride and 2.0 parts of dry sulfolane was heated at 135° C. following the procedure of Example 1, until the resinous mass began to show stringiness (approximately 40 minutes). With heating continued, there was added to this melt in small portions over a one-hour period a mixture of 6.14 parts of ferrocene, 4.08 parts of o-anisaldehyde and 8.0 parts of sulfolane. Heating was discontinued after a total of 4.0 hours at the specified temperature. The melt was washed with water and was worked up as in Example 7, using peroxide-free dioxane as solvent and isopropanol and water as the precipitants for the first and second fractions. The first fraction, 23.55 parts (61.8% yield), was a yellow-brown solid partially melting at 165–180° C. The found $M_n$ value was 4590 (in benzene), and the analytical data were as follows: C, 71.42; H, 5.11; Fe, 18.09. The theoretical composition above, with $n=14$, requires: C, 70.80; H, 5.31; Fe, 18.85. The second precipitate upon ferrocene removal by vacuum sublimation, was obtained in 13.0% yield (6.20 parts) and showed $M_n$ 860 and the following analytical data: C, 70.46; H, 5.47.

Both polymer fractions were identical in elemental composition and infrared spectra with the products obtained by the known method of melt polycondensation, except that application of the novel solution condensation resulted in both a higher yield and a number-average molecular weight more than twice the average $M_n$ range attained in melt condensations.

EXAMPLE 12

A run was conducted following the procedure of Example 11, except that nitrobenzene was used as solvent and the total heating time was restricted to 2.0 hours. Work-up as in Example 11 gave polymer essentially having the structure shown in Example 11, in a total yield of 59.9%. The first, major fraction had $M_n$ 4070 (in benzene) and showed the following analytical data: C, 71.44; H, 5.21.

EXAMPLE 12a

Runs similar to that of Example 11 or 12 above were conducted, employing the respective solvents, total heating times and temperatures as follows: nitromethane (1.7 hours total heating time at 120° C.); propionitrile (7.0 hours at 100° C.); benzonitrile (2 hours at 132° C.); and diphenylsulfone (8 hours at 120° C.). These runs each resulted in polymers of essentially the same elemental compositions as Example 11 or 12, with $M_n$ values of the first, major fractions being, respectively, 4370, 2370, 4300, 3650 (all in benzene).

The polymers produced according to the invention process and described above, such as the benzyl polymers and the metallocenyl polymers, e.g., the ferrocene polymers, have general utility as coatings, sealants, and laminating and potting materials. The ferrocene polymers are useful in this respect particularly to impart heat stability, and also ultraviolet light absorbing and stabilizing properties. Such polymers, e.g., the ferrocene polymers, can also be added to other resins such as phenolic resins in the A stage to produce adhesives, potting and laminating materials.

An example of the preparation of an ultraviolet light absorbing film from a ferrocene polymer produced according to the invention process is set forth below.

EXAMPLE 13

A sample of the polymer obtained in Example 5 is dissolved in cyclohexanone, and the solution sprayed onto 1-inch diameter quartz windows to cast a thin transparent film thereon, and the film is dried. Placed between quartz windows or other suitable composite strata, the film can be used as ultraviolet absorbing component in multilayer transparent window systems.

While we have described particular embodiments of our invention for the purpose of illustration, it should be understood that various modifications and adaptations thereof may be made within the spirit of the invention, and within the scope of the appended claims.

We claim:

1. The process which comprises reacting a metallocenylcarbinyl compound selected from the group consisting of ferrocenyl, ruthenocenyl, and osmocenyl, alkanols; and ferrocenylcarbinyl, ruthenocenylcarbinyl and osmocenylcarbinyl, halides and ethers, in the presence of a Lewis acid as catalyst, at temperatures in the range of about 70° to about 160° C., in about 10% to about 10 times the weight of said reactant, in a dipolar aprotic solvent of low basicity and poor cation solvating power, selected from the group consisting of sulfones, aliphatic nitriles, aromatic nitriles, nitroaliphatics and nitroaromatics, and recovering a polymeric product comprising a plurality of recurring metallocenyl units.

2. The process which comprises polymerizing a metallocenylcarbinyl selected from the group consisting of ferrocenyl, ruthenocenyl, and osmocenyl, alkanols; and ferrocenylcarbinyl, ruthenocenylcarbinyl and osmocenylcarbinyl, halides and ethers, in the presence of a Lewis acid as catalyst, the reaction being carried out in a dipolar aprotic solvent of low basicity and poor solvating power, selected from the group consisting of sulfones, aliphatic nitriles, aromatic nitriles, nitroaliphatics and nitroaromatics, in an amount ranging from about 10% to about 10 times the weight of the starting material.

3. The process which comprises reacting a ferrocenylcarbinyl compound selected from the group consisting of ferrocenyl alkanols, ferrocenylcarbinyl halides and ferrocenylcarbinyl ethers, in the presence of a Lewis acid as catalyst, employing about 3% to about 25% of said catalyst by weight of said reactants, at temperatures in the range of about 70° to about 160° C., in about 10% to about 10 times the weight of said reactants, in sulfolane as solvent and recovering a polymeric product, said product having a plurality of recurring ferrocenyl units.

4. The process of polymerizing a metallocenylcarbinyl compound selected from the group consisting of ferrocenyl, ruthenocenyl, and osmocenyl, alkanols; and ferrocenylcarbinyl, ruthenocenylcarbinyl and osmocenylcarbinyl, halides and ethers, which comprises reacting said metallocenylcarbinyl compound in the presence of an acid catalyst, in a dipolar aprotic solvent of low basicity and poor cation solvating power, selected from the group consisting of sulfones, aliphatic nitriles, aromatic nitriles, nitroaliphatics and nitroaromatics.

5. The process which comprises polymerizing a metallocenylcarbinyl compound selected from the group consisting of ferrocenyl, ruthenocenyl and osmocenyl alkanols, in the presence of an acidic catalyst, the reaction being carried out in a dipolar aprotic solvent of low basicity and poor cation solvating power selected from the group consisting of sulfones, aliphatic nitriles, aromatic nitriles, nitroaliphatics and nitroaromatics.

6. The process which comprises polymerizing a metallocenylcarbinyl compound selected from the group consisting of ferrocenyl, ruthenocenyl, and osmocenyl, alkanols; and ferrocenylcarbinyl, ruthenocenylcarbinyl and osmocenylcarbinyl, halides and ethers in the presence of a Lewis acid as catalyst, the reaction being carried out in a dipolar aprotic solvent of low basicity and poor cation solvating power selected from the group consisting of sulfones, aliphatic nitriles, aromatic nitriles, nitroaliphatics and nitroaromatics.

7. The process which comprises polymerizing a metallocenylcarbinyl compound selected from the group consisting of ferrocenyl, ruthenocenyl and osmocenyl alkanols, in sulfolane as solvent in an amount of about 10% to about 10 times the weight of said alkanol, and in the presence of a Lewis acid as catalyst.

8. The process which comprises reacting a metallocenylcarbinyl compound selected from the group consisting of ferrocenyl, ruthenocenyl, and osmocenyl, alkanols; and ferrocenylcarbinyl, ruthenocenylcarbinyl and osmocenylcarbinyl, halides and ethers, in the presence of zinc chloride as catalyst, at temperatures in the range of about 70 to about 160° C., in about 10% to about 10 times the weight of said compound, of sulfolane as solvent, and recovering a polymeric product, said product having a plurality of recurring metallocenyl units.

References Cited

UNITED STATES PATENTS

| | | | |
|---|---|---|---|
| 2,414,028 | 1/1947 | Dietrich et al. | 260—2 |
| 2,486,831 | 11/1949 | Feasly et al. | 260—2 |
| 3,066,101 | 11/1962 | Wilgus | 260—2 |
| 3,076,785 | 2/1963 | Kiessling et al. | 260—2 |
| 3,238,185 | 3/1966 | Neuse | 260—2 |
| 3,291,777 | 12/1966 | Stamatoff et al. | 260—2 |
| 3,341,495 | 9/1967 | Neuse | 260—2 |
| 3,345,332 | 10/1967 | Hoyt et al. | 260—2 |
| 2,092,295 | 9/1937 | Van Peski et al. | 260—671 |
| 2,136,270 | 11/1938 | Bennett | 260—671 |
| 2,422,247 | 6/1947 | Lieber et al. | 260—671 |
| 2,655,549 | 10/1953 | Welch et al. | 260—671 |
| 2,709,175 | 5/1955 | Graham | 260—671 |

SAMUEL H. BLECH, *Primary Examiner.*

U.S. Cl. X.R.

260—2, 47, 63, 67, 429, 439, 844; 161—192, 198; 117—123, 161